(12) United States Patent
Wang

(10) Patent No.: US 12,429,606 B2
(45) Date of Patent: Sep. 30, 2025

(54) SIMPLIFIED PRECISE POSITIONING ENGINE (PPE) BACKWARD SMOOTHING

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/339,083

(22) Filed: Jun. 21, 2023

(65) Prior Publication Data

US 2025/0028062 A1    Jan. 23, 2025

(51) Int. Cl.
*G01S 19/43* (2010.01)
(52) U.S. Cl.
CPC .................... *G01S 19/43* (2013.01)
(58) Field of Classification Search
CPC ................................ G01S 19/43–44
See application file for complete search history.

(56) References Cited

U.S. PATENT DOCUMENTS

| 7,498,979 | B2 * | 3/2009 | Liu ............... | G01S 19/44 342/357.27 |
| 2024/0168174 | A1 * | 5/2024 | Talbot ........... | G01S 19/43 |

OTHER PUBLICATIONS

R. Monikes, A. Teltschik, J. Wendel and G. F. Trommer, "Post-processing GNSS/INS Measurements Using a Tightly Coupled Fixed-Interval Smoother Performing Carrier Phase Ambiguity Resolution," 2006 IEEE/ION Position, Location, And Navigation Symposium, Coronado, CA, USA, 2006, pp. 283-290 (Year: 2006).*

* cited by examiner

*Primary Examiner* — Cassi J Galt
(74) *Attorney, Agent, or Firm* — QUALCOMM Incorporated

(57) ABSTRACT

In some implementations, a global navigation satellite system (GNSS) device may determine a plurality of position estimates of the GNSS device for a plurality of epochs spanning a period of time beginning with a first epoch and ending with a second epoch. The GNSS device may determine position change values comprising a position change value of the GNSS device for each successive epoch of the plurality of epochs based at least in part on delta carrier phase (DCP) values for the plurality of epochs. The GNSS device may perform backward smoothing on the plurality of position estimates, modifying at least a portion of the plurality of position estimates based at least in part on the position estimate of the second epoch and the position change values. The GNSS device may output information indicative of at least a portion of the modified position estimates of the GNSS device.

28 Claims, 10 Drawing Sheets

| 1 | 2 | 3 | 4 | 5 | 6 | 7 | 8 |
|---|---|---|---|---|---|---|---|
| TIME | GT XYZ (M) | FORWARD XYZ (M) | FORWARD PERFORMANCE 3D ERR (M) FORWARD XYZ MINUS GT XYZ | DCP DETERMINED DELTAXYZ (M) | ACCUMULATED DELTAXYZ | BACKWARD SMOOTHED XYZ (M) FORWARD XYZ AT T3 MINUS ACCUMULATED DELTAXYZ | BACKWARD 3D ERR |
| 107055.4 (t0) | 2175368.955, 4384314.444, 4076109.801 | 2175369.733, 4384315.668, 4076110.034 | -0.778, 1.224, 0.233 | | (from t3 to t0) 43.353, 25.794, -0.628 | -2175369.138, 4384314.332, 4076109.851 | -0.183, -0.112, 0.050 |
| 107075.4 (t1) | 2175354.678, 4384322.785, 4076109.573 | 2175355.080, 4384323.342, 4076109.772 | -0.402, 0.557, 0.199 | (from t0 to t1) 14.282, 8.378, -0.223 | (from t3 to t1) 29.071, 17.416, -0.405 | -2175354.856, 4384322.710, 4076109.628 | -0.178, -0.075, 0.055 |
| 107095.4 (t2) | 2175340.207, 4384331.285, 4076109.327 | 2175340.444, 4384331.408, 4076109.389 | -0.237, 0.123, 0.062 | (from t1 to t2) 14.466, 8.515, -0.244 | (from t3 to t2) 14.605, 8.901, -0.161 | -2175340.390, 4384331.225, 4076109.384 | -0.183, -0.060, 0.057 |
| 107115.4 (t3) | 2175325.601, 4384340.161, 4076109.161 | 2175325.785, 4384340.126, 4076109.223 | -0.184, -0.035, 0.062 | (from t2 to t3) 14.605, 8.901, -0.161 | (from t3 to t3) 0.000, 0.000, 0.000 | -2175325.785, 4384340.126, 4076109.223 | -0.184, -0.035, 0.062 |

FIG. 6

SIMPLIFIED PRECISE POSITIONING ENGINE (PPE) BACKWARD SMOOTHING

BACKGROUND

1. Field of Disclosure

The present disclosure relates generally to the field of mobile device positioning using radio frequency (RF) signals, and more specifically to global navigation satellite system (GNSS)-based positioning.

2. Description of Related Art

The global navigation satellite system (GNSS) is widely used for positioning consumer electronic devices such as smartphones, as well as for positioning vehicles such as cars, trucks, ships, and aircraft. High-accuracy positioning can provide significant value to various modern-day positioning-based applications. For example, an autonomous driving application may benefit from meter-level positioning information that enables it to determine which particular lane of a road an autonomously-driven vehicle is in and may further benefit from sub-meter-level positioning information that enables it to determine where that vehicle is located within the lane.

High-accuracy positioning of a mobile device comprising a GNSS receiver may involve the use of a precise positioning engine (PPE) at the mobile device to generate high-accuracy positioning information based on GNSS measurements and error correction data. The error correction data may be received at the mobile device from a high-accuracy positioning service, such as a precise point positioning (PPP) or real-time kinematic (RTK) positioning service. To determine the high-precision location estimate, the PPE may use an extended Kalman filter (EKF) to solve for the value of an ambiguity term of a carrier-phase measurement. This may take a period of time, known as a convergence time. Before convergence, a horizontal error (HE) of the location estimate for the mobile device may be significantly larger than after convergence. In some applications, accurate location estimates of a mobile device prior to convergence may be desired. Applying a converged solution to pre-convergence data to obtain such accurate location estimates is known as "backward smoothing."

BRIEF SUMMARY

An example method of backward smoothing positions of a global navigation satellite system (GNSS) device based on delta carrier phase (DCP) values, according to this disclosure, may comprise determining a plurality of position estimates of the GNSS device for a plurality of epochs, the plurality of epochs spanning a period of time beginning with a first epoch and ending with a second epoch. The method also may comprise determining position change values, the position change values comprising a position change value of the GNSS device for each successive epoch of the plurality of epochs based at least in part on DCP values for the plurality of epochs. The method also may comprise performing backward smoothing on the plurality of position estimates, the backward smoothing comprising modifying at least a portion of the plurality of position estimates based at least in part on the position estimate of the second epoch and the position change values. The method also may comprise outputting information indicative of at least a portion of the modified position estimates of the GNSS device.

An example global navigation satellite system (GNSS) device for backward smoothing positions of the GNSS device based on delta carrier phase (DCP) values, according to this disclosure, may comprise a GNSS receiver, a memory, one or more processors communicatively coupled with the GNSS receiver and the memory, wherein the one or more processors are configured to determine a plurality of position estimates of the GNSS device for a plurality of epochs, the plurality of epochs spanning a period of time beginning with a first epoch and ending with a second epoch. The one or more processors further may be configured to determine position change values, the position change values comprising a position change value of the GNSS device for each successive epoch of the plurality of epochs based at least in part on DCP values for the plurality of epochs. The one or more processors further may be configured to perform backward smoothing on the plurality of position estimates, the backward smoothing comprising modifying at least a portion of the plurality of position estimates based at least in part on the position estimate of the second epoch and the position change values. The one or more processors further may be configured to output information indicative of at least a portion of the modified position estimates of the GNSS device.

An example apparatus for backward smoothing positions of a global navigation satellite system (GNSS) device based on delta carrier phase (DCP) values, according to this disclosure, may comprise means for determining a plurality of position estimates of the GNSS device for a plurality of epochs, the plurality of epochs spanning a period of time beginning with a first epoch and ending with a second epoch. The apparatus further may comprise means for determining position change values, the position change values comprising a position change value of the GNSS device for each successive epoch of the plurality of epochs based at least in part on DCP values for the plurality of epochs. The apparatus further may comprise means for performing backward smoothing on the plurality of position estimates, the backward smoothing comprising modifying at least a portion of the plurality of position estimates based at least in part on the position estimate of the second epoch and the position change values. The apparatus further may comprise means for outputting information indicative of at least a portion of the modified position estimates of the GNSS device.

According to this disclosure, an example non-transitory computer-readable medium stores instructions for backward smoothing positions of a global navigation satellite system (GNSS) device based on delta carrier phase (DCP) values, the instructions comprising code for determining a plurality of position estimates of the GNSS device for a plurality of epochs, the plurality of epochs spanning a period of time beginning with a first epoch and ending with a second epoch. The instructions further may comprise code for determining position change values, the position change values comprising a position change value of the GNSS device for each successive epoch of the plurality of epochs based at least in part on DCP values for the plurality of epochs. The instructions further may comprise code for performing backward smoothing on the plurality of position estimates, the backward smoothing comprising modifying at least a portion of the plurality of position estimates based at least in part on the position estimate of the second epoch and the position change values. The instructions further may comprise code for outputting information indicative of at least a portion of the modified position estimates of the GNSS device.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 6 is an illustration of a table showing values for an example case in which techniques provided herein for simplified (quasi-real-time) PPE backward smoothing are applied to example data.

Figure 1:
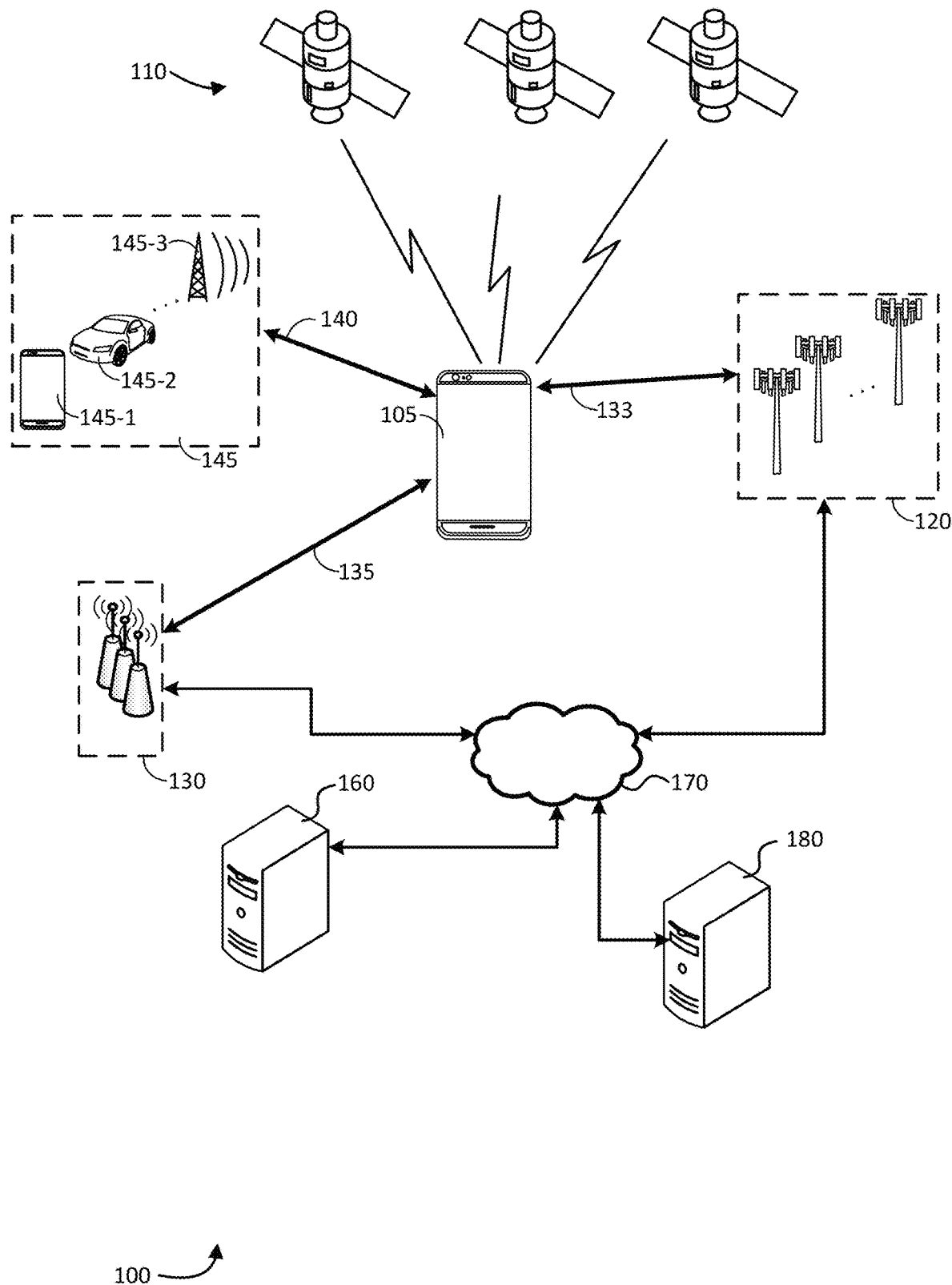
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc., or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative examples will now be described with respect to the accompanying drawings, which form a part hereof. While particular examples, in which one or more aspects of the disclosure may be implemented, are described below, other examples may be used, and various modifications may be made, without departing from the scope of the disclosure.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" and "User Equipment" (UE) may be used interchangeably and are not intended to be specific or otherwise limited to any particular Radio Access Technology (RAT), unless otherwise noted. In general, a mobile device and/or UE may be any wireless communication device (e.g., a mobile phone, router, tablet computer, laptop computer, tracking device, wearable (e.g., smartwatch, glasses, Augmented Reality (AR)/Virtual Reality (VR) headset, etc.), vehicle (e.g., automobile, vessel, aircraft motorcycle, bicycle, etc.), Internet of Things (IoT) device, etc.), or another electronic device that may be used for Global Navigation Satellite Systems (GNSS) positioning as described herein. According to some embodiments, a mobile device and/or UE may be used to communicate over a wireless communications network. A UE may be mobile or may (e.g., at certain times) be stationary, and may communicate with a Radio Access Network (RAN). As used herein, the term UE may be referred to interchangeably as an Access Terminal (AT), a client device, a wireless device, a subscriber device, a subscriber terminal, a subscriber station, a user terminal (UT), a mobile device, a mobile terminal, a mobile station, or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 standard, etc.), and so on.

A "space vehicle" (SV) as referred to herein, relates to an object that is capable of transmitting signals to receivers on the earth's surface. In one particular example, such an SV may comprise a geostationary satellite. Alternatively, an SV may comprise a satellite traveling in an orbit and moving relative to a stationary position on the Earth. However, these are merely examples of SVs and claimed subject matter is not limited in these respects. SVs also may be referred to herein simply as "satellites."

As described herein, a GNSS receiver may comprise and/or be incorporated into an electronic device. This may include a single entity or may include multiple entities such as in a personal area network where a user may employ audio, video, and/or data I/O devices and/or body sensors and a separate wireline or wireless modem. As described herein, an estimate of the location of a GNSS receiver may be referred to as a location, location estimate, location fix, fix, position, position estimate, or position fix, and may be geodetic, thus providing location coordinates for the GPS receiver (e.g., latitude and longitude) which may or may not include an altitude component (e.g., height above sea level, height above or depth below ground level, floor level or basement level). In some embodiments, a location of the GPS receiver and/or an electronic device comprising the GPS receiver may also be expressed as an area or volume (defined either geodetically or in civic form) within which the GPS receiver is expected to be located with some probability or confidence level (e.g., 67%, 95%, etc.). In the description contained herein, the use of the term location may comprise any of these variants unless indicated otherwise. When computing the location of a GPS receiver, such computations may solve for local X, Y, and possibly Z coordinates and then, if needed, convert the coordinates from one coordinate frame to another.

As used herein, the terms "position" and "location" are used interchangeably. Further, terms such as "position determination," "position fix," "location estimate," "estimated location," "location fix," and the like are also used interchangeably herein with regard to GNSS-based positioning to refer to an estimated position of a mobile device or other device comprising a GNSS receiver. The position or location may be a two-dimensional position, e.g., with regard to a two-dimensional map, or a three-dimensional position.

As noted, a high-accuracy position of a mobile device comprising a GNSS receiver may be determined with a precise positioning engine (PPE), which may be executed by the mobile device, based on GNSS measurements and error correction data. In some applications, the location estimates of a mobile device prior to convergence may be corrected retroactively using post-convergence data (e.g., value of an ambiguity term, which is unknown prior to convergence). More accurate historical location information, for example, can lead to better location accuracy of current location estimates. This retroactive correction, or "backward smoothing," traditionally utilizes a separate extended Kalman filter (EKF) to process the data retroactively, which can require the mobile device to buffer a large amount of raw history measurement information. These additional processing and memory requirements can be restrictive, especially for low-cost GNSS platforms.

Embodiments described herein address these and other issues by enabling quasi-real-time PPE backward smoothing without the need to buffer raw measurements or use a separate EKF engine to process historical information. More specifically, embodiments can leverage delta carrier phase (DCP) information to buffer accurate delta positioning information between epochs, which can then be used for backward smoothing in a much more efficient manner than running a separate EKF engine.

Various aspects of the embodiments herein relate generally to GNSS positioning of a GNSS device. Some aspects more specifically relate to backward smoothing of historical GNSS-based positions for the GNSS device. In some examples, delta positioning information may be accumulated over a series of epochs responding to a set of initial GNSS positions. These initial GNSS positions subsequently may be subject to backward smoothing based on the delta positioning information and a subsequently-determined position. According to some embodiments, pre-convergence positions may be subject to backward smoothing once convergence (determination of an ambiguity term in carrier-phase measurements) occurs.

Particular aspects of the subject matter described in this disclosure can be implemented to realize one or more of the following potential advantages. In some examples, by buffering delta position information, the described techniques can be used to perform backward smoothing using far less memory and/or processing resources than traditional techniques. This can enable backward smoothing on low-cost devices that may not have the resources for traditional backward smoothing. Additional benefits will be apparent to who a person of ordinary skill in the art, based on the information provided herein. Embodiments are provided in detail below, after a review of relevant technology.

FIG. 1 is a simplified illustration of a positioning system 100 in which a mobile device 105, location server 160, and/or other components of the positioning system 100 can use the techniques provided herein for performing backward smoothing, according to an embodiment. The techniques described herein may be implemented by one or more components of the positioning system 100. The positioning system 100 can include a mobile device 105; one or more satellites 110 (also referred to as space vehicles (SVs)) for a GNSS such as the GPS, GLONASS (GLO), Galileo (GAL), or BeiDou Navigation Satellite System (BDS) over China; base stations 120; access points (APs) 130; location server 160; network 170; and external client 180. Generally put, the positioning system 100 can estimate a location of the mobile device 105 based on radio frequency (RF) signals received by and/or sent from the mobile device 105 and known locations of other components (e.g., GNSS satellites 110, base stations 120, APs 130) transmitting and/or receiving the RF signals. Additional details regarding GNSS-based positioning are discussed in more detail with regard to FIG. 2.

In this example, FIG. 1 illustrates the mobile device 105 as a smartphone device, however, mobile devices may be any suitable device that includes GNSS capabilities or may be a device or machine into which such GNSS capabilities are integrated. Thus, a mobile device 105 may include personal devices such as a smartphone, smartwatch, tablet, laptop, etc. However, mobile devices may include a larger class of devices as well and may include vehicles with integrated GNSS receivers and positioning systems, such as boats or ships, cars, trucks, aircraft, shipping containers, etc. As noted, in certain contexts, such as in reference to a cellular network, the mobile device 105 may be referred to as a UE.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G, and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with the known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, and/or static communication/positioning device 145-3.

When or more other mobile devices 145 are used in the position determination of a particular mobile device 105, the mobile device 105 for which the position is to be determined may be referred to as the "target mobile device," and each of the one or more other mobile devices 145 used may be referred to as an "anchor mobile device." For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards.

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of another mobile device 145 at some known previous time). As noted elsewhere herein, a location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as a friend or relative finder, or child or pet location). Additionally or alternatively, the external client 180 may obtain and provide the location of mobile device 105 to an emergency services provider, government agency, etc.

As noted, the mobile device 105 of FIG. 1 may be capable of GNSS positioning. Details regarding the GNSS positioning of a mobile device 105, or any device comprising a GNSS receiver, are provided hereafter with regard to FIG. 2.

Figure 2:
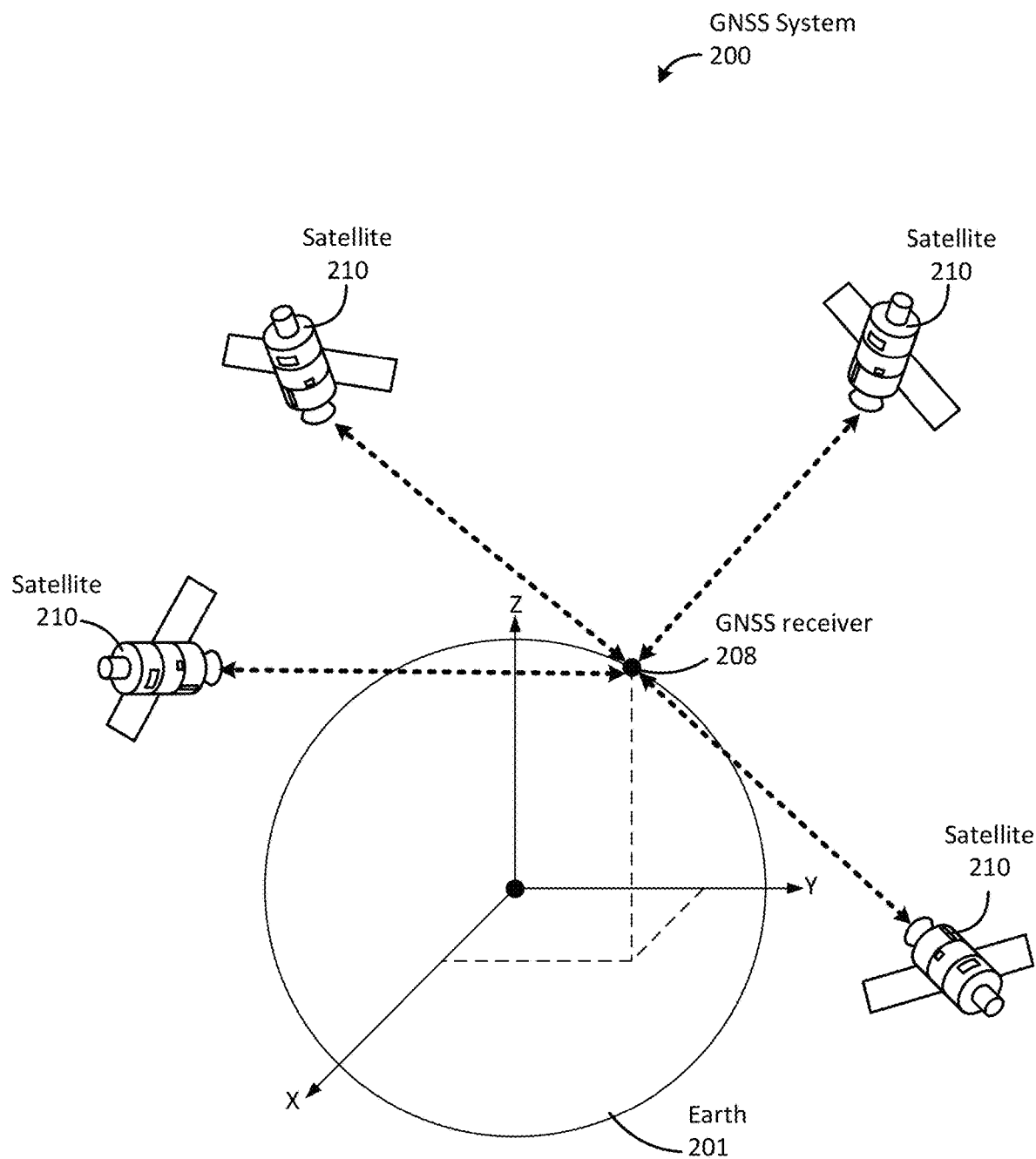
FIG. 2 is a simplified diagram of a GNSS system, according to an embodiment.

FIG. 2 is a simplified diagram of a GNSS system 200, provided to illustrate how GNSS is generally used to determine an accurate location of a GNSS receiver 208 on earth 201. Put generally, the GNSS system 200 enables an accurate GNSS position fix of the GNSS receiver 208, which receives RF signals from GNSS satellites 210 (or SVs, which may correspond with satellites 110 of FIG. 1) from one or more GNSS constellations. The types of GNSS receiver 208 used may vary, depending on the application. In some embodiments, for instance, the GNSS receiver 208 may comprise a standalone device or component incorporated into another device (e.g., mobile device 105 of FIG. 1). In some embodiments, the GNSS receiver 208 may be integrated into industrial or commercial equipment, such as survey equipment, Internet of Things (IoT) devices, etc.

It will be understood that the diagram provided in FIG. 2 is greatly simplified. In practice, there may be dozens of satellites 210 and a given GNSS constellation, and there are many different types of GNSS systems. As noted, GNSS systems include GPS, Galileo, GLONASS, or BDS. Additional GNSS systems include, for example, Quasi-Zenith Satellite System (QZSS) over Japan, Indian Regional Navigational Satellite System (IRNSS) over India, etc. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration/multilateration, which is a method of determining position by measuring distances to points at known coordinates. In general, the determination of the position of a GNSS receiver 208 in three dimensions may rely on a determination of the distance between the GNSS receiver 208 and four or more satellites 210. As illustrated, 3D coordinates may be based on a coordinate system (e.g., Cartesian coordinates in format of X, Y and Z; geographic coordinates in format of latitude, longitude, and altitude; etc.) centered at the earth's center of mass. A distance between each satellite 210 and the GNSS receiver 208 may be determined using precise measurements made by the GNSS receiver 208 of a difference in time from when an RF signal is transmitted from the respective satellite 210 to when it is received at the GNSS receiver 208. To help ensure accuracy, not only does the GNSS receiver 208 need to make an accurate determination of when the respective signal from each satellite 210 is received, but many additional factors need to be considered and accounted for. These factors include, for example, clock differences at the GNSS receiver 208 and satellite 210 (e.g., clock bias), a precise location of each satellite 210 at the time of transmission (e.g., as determined by the broadcast ephemeris), the impact of atmospheric distortion (e.g., ionospheric and tropospheric delays), and the like.

To perform a traditional GNSS position fix, the GNSS receiver 208 can use code-based positioning to determine its distance to each satellite 210 based on a determined delay in a generated pseudorandom binary sequence received in the RF signals received from each satellite, in consideration of the additional factors and error sources previously noted. Code-based positioning measurements for positioning in this manner may be referred to as pseudo-range (or PR) measurements. With the distance and location information of the satellites 210, the GNSS receiver 208 can then determine a position fix for its location. This position fix may be determined, for example, by a Standalone Positioning Engine (SPE) executed by one or more processors of the GNSS receiver 208. However, code-based positioning is relatively inaccurate and, without error correction, and is subject to many of the previously described errors. Even so, code-based GNSS positioning can provide a positioning accuracy for the GNSS receiver 208 on the order of meters.

More accurate carrier-based ranging is based on a carrier wave of the RF signals received from each satellite and further uses error correction to help reduce errors from the previously noted error sources. Carrier-based positioning measurements for positioning in this manner may be referred to as carrier phase (or CP) measurements. Some techniques utilize differential error correction, in which errors (e.g., atmospheric errors sources) in the carrier-based ranging of satellites 210 observed by the GNSS receiver 208 can be mitigated or canceled based on similar carrier-based ranging of the satellites 210 using a highly accurate GNSS receiver at the base station at a known location. These measurements and the base station's location can be provided to the GNSS receiver 208 for error correction. This position fix may be determined, for example, by a Precise Positioning Engine (PPE) executed by one or more processors of the GNSS receiver 208. More specifically, in addition to the information provided to an SPE, the PPE may use base station GNSS measurement information, and additional correction information, such as troposphere and ionosphere, to provide a high-accuracy, carrier-based position fix. Several GNSS techniques can be adopted in PPE, such as Differential GNSS (DGNSS), Real-Time Kinematic (RTK), and Precise Point Positioning (PPP), and may provide a sub-meter accuracy (e.g., on the order of centimeters). (An SPE and/or PPE may be referred to herein as a GNSS positioning engine and may be incorporated into a broader positioning engine that uses other (non-GNSS) positioning sources.)

Multi-frequency GNSS receivers use satellite signals from different GNSS frequency bands (also referred to herein simply as "GNSS bands") to determine desired information such as pseudoranges, position estimates, and/or time. Using multi-frequency GNSS may provide better performance (e.g., position estimate speed and/or accuracy) than single-frequency GNSS in many conditions. However, using multi-frequency GNSS typically uses more power than single-frequency GNSS, e.g., processing power and battery power (e.g., to power a processor (e.g., for determining measurements), baseband processing, and/or RF processing).

Referring again to FIG. 2, the satellites 210 may be members of a single satellite constellation, i.e., a group of satellites that are part of a GNSS system, e.g., controlled by a common entity such as a government, and orbiting in complementary orbits to facilitate determining positions of entities around the world. One or more of the satellites 210 may transmit multiple satellite signals in different GNSS frequency bands, such as L1, L2, and/or L5 frequency bands. The terms L1 band, L2 band, and L5 band are used herein because these terms are used for GPS to refer to respective ranges of frequencies. Various receiver configurations may be used to receive satellite signals. For example, a receiver may use separate receive chains for different frequency bands. As another example, a receiver may use a common receive chain for multiple frequency bands that are close in frequency, for example L2 and L5 bands. As another example, a receiver may use separate receive chains for different signals in the same band, for example GPS L1 and GLONASS L1 sub-bands. A single receiver may use a combination of two or more of these examples. These configurations are examples, and other configurations are possible.

Multiple satellite bands are allocated to satellite usage. These bands include the L-band, used for GNSS satellite communications, the C-band, used for communications satellites such as television broadcast satellites, the X-band, used by the military and for RADAR applications, and the Ku-band (primarily downlink communication and the Ka-band (primarily uplink communications), the Ku and Ka bands used for communications satellites. The L-band is defined by IEEE as the frequency range from 1 to 2 GHz. The L-Band is utilized by the GNSS satellite constellations such as GPS, Galileo, GLONASS, and BDS, and is broken into various bands, including L1, L2, and L5. For location purposes, the L1 band has historically been used by commercial GNSS receivers. However, measuring GNSS signals across more than one band may provide for improved accuracy and availability.

As previously noted, a PPE may provide a high-accuracy location estimate for a GNSS receiver. The PPE may take a period of time (convergence time) to converge on an ambiguity term before providing the high-accuracy location estimate. This can subsequently be used for backward smoothing. Additional details are provided below with respect to FIG. 3.

Figure 3:
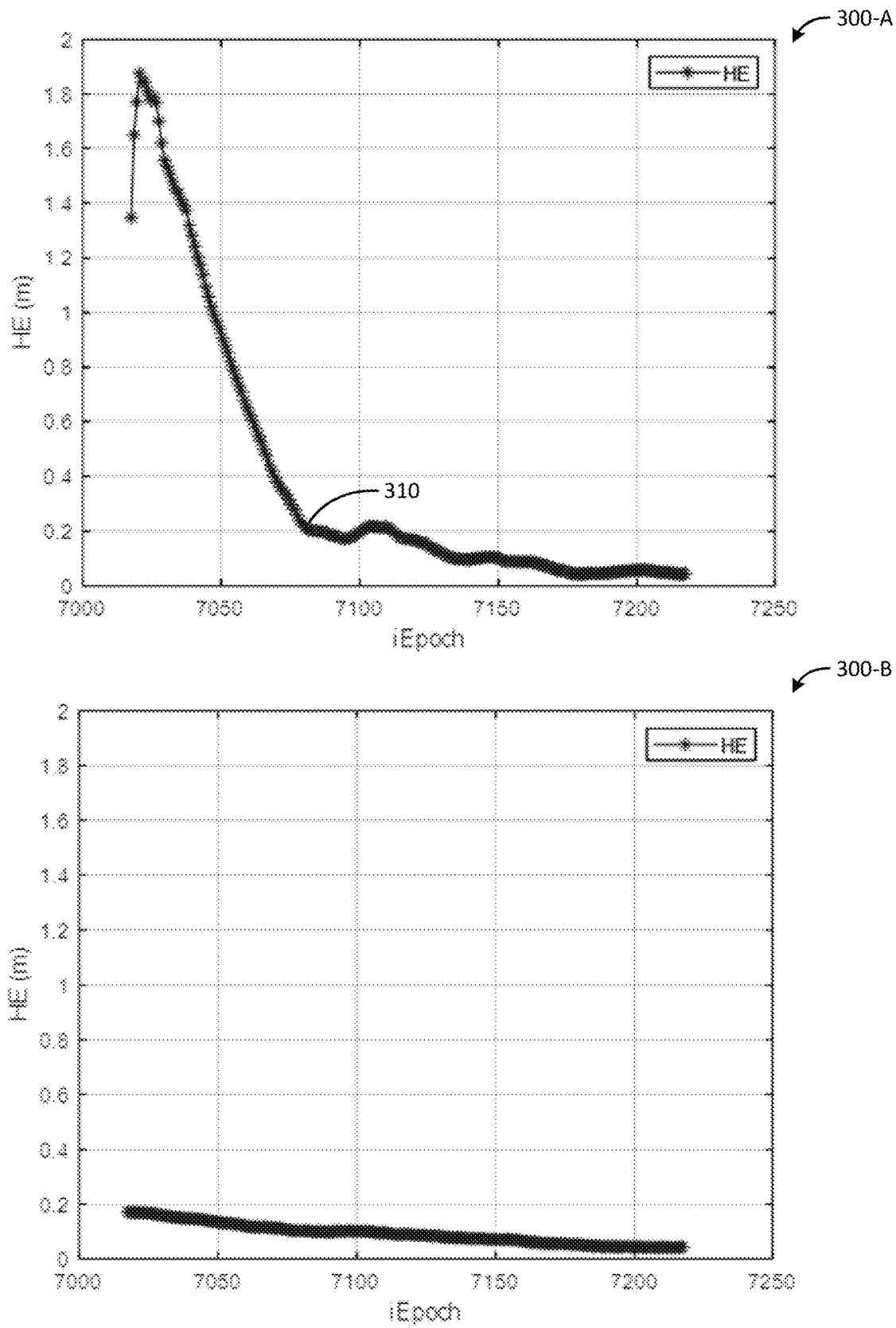
FIG. 3 includes charts that plot horizontal error, provided to illustrate how backward smoothing may be performed, according to some embodiments.

FIG. 3 is an illustration of a first graph 300-A and a second graph 300-B, plotting horizontal error (HE) over approximately 200 epochs. (In most applications, each epoch is one second.) The data in the first graph 300-A illustrates a typical location estimation process, in which a PPE uses an EKF for forward location estimation. As can be seen, HE may be relatively large at first (peaking at approximately 1.9 m, in this example), then subsequently becomes highly accurate, staying at or below 0.2 m after point 310 (the approximate point of convergence).

The second graph 300-B illustrates the data of graph 300-A after backward smoothing is applied. Traditionally, backward smoothing is applied after the forward processing is performed to generate the EKF estimate state (ambiguity status converged). Here, the EKF state at convergence time, tn, may be represented as ($P_{tn}$, $\sigma P_{tn}$). To perform backward smoothing, the EKF state at convergence time tn may be used as the starting state for a separate EKF that processes the data retroactively (e.g., to start time, t0). This can result in a significant improvement in the accuracy of the historical location for the mobile device, as shown by the reduced HE of the second graph 300-B relative to the first graph 300-A.

Backward smoothing can not only ensure better accuracy for current EKF location estimates but also may be useful in other applications. It may be useful, for example, in applications using location intelligence collection, such as wearable high-precision trajectory computation Internet of Things (IoT) device high-precision trajectory, and machine control trajectory analysis. Backward smoothing also may be useful in government-enforced mobile terminal positioning (e.g., requirements under the China Academy of Information and Communications Technology (CAICT) specification). Applications also may include PPE integration with other technologies, such as inertial measurement unit (IMU) positioning, high definition (HD) mapping, vision, and the like. More accurate historical positioning from the PPE due to backward smoothing can better calibrate the bias/parameters related to other sensor/technology and therefore improve the real-time integration performance. Further, because current machine learning (ML) approaches to uncertainty modeling required feature input from historical location data, backward smoothing can result in better measurement uncertainty prediction by ML models.

As previously noted, traditional techniques for backward smoothing typically utilize a separate EKF to process the data retroactively. This can require a large amount of memory and processing (e.g., million instructions per second (MIPS)) resources to buffer and process a large amount of raw history measurement information (e.g., all measurement information between convergence time tn and start time t0). As previously noted, such processing and memory requirements can be prohibitive, especially for low-cost GNSS platforms. In contrast, embodiments herein (described in more detail below) may utilize a quasi-real-time PPE backward smoothing that does not require the buffering of historical raw measurements for the use of a separate EKF engine to process the historical information after convergence. As such, embodiments herein may be utilized in a PPE solution for low-cost platforms. (As used herein, the term "quasi-real-time" with respect to backward smoothing indicates a significant reduction in latency for backward smoothing, compared with traditional backward smoothing techniques. The latency for quasi-real-time backward smoothing may be effectively treated as real-time in some applications.)

Figure 4:
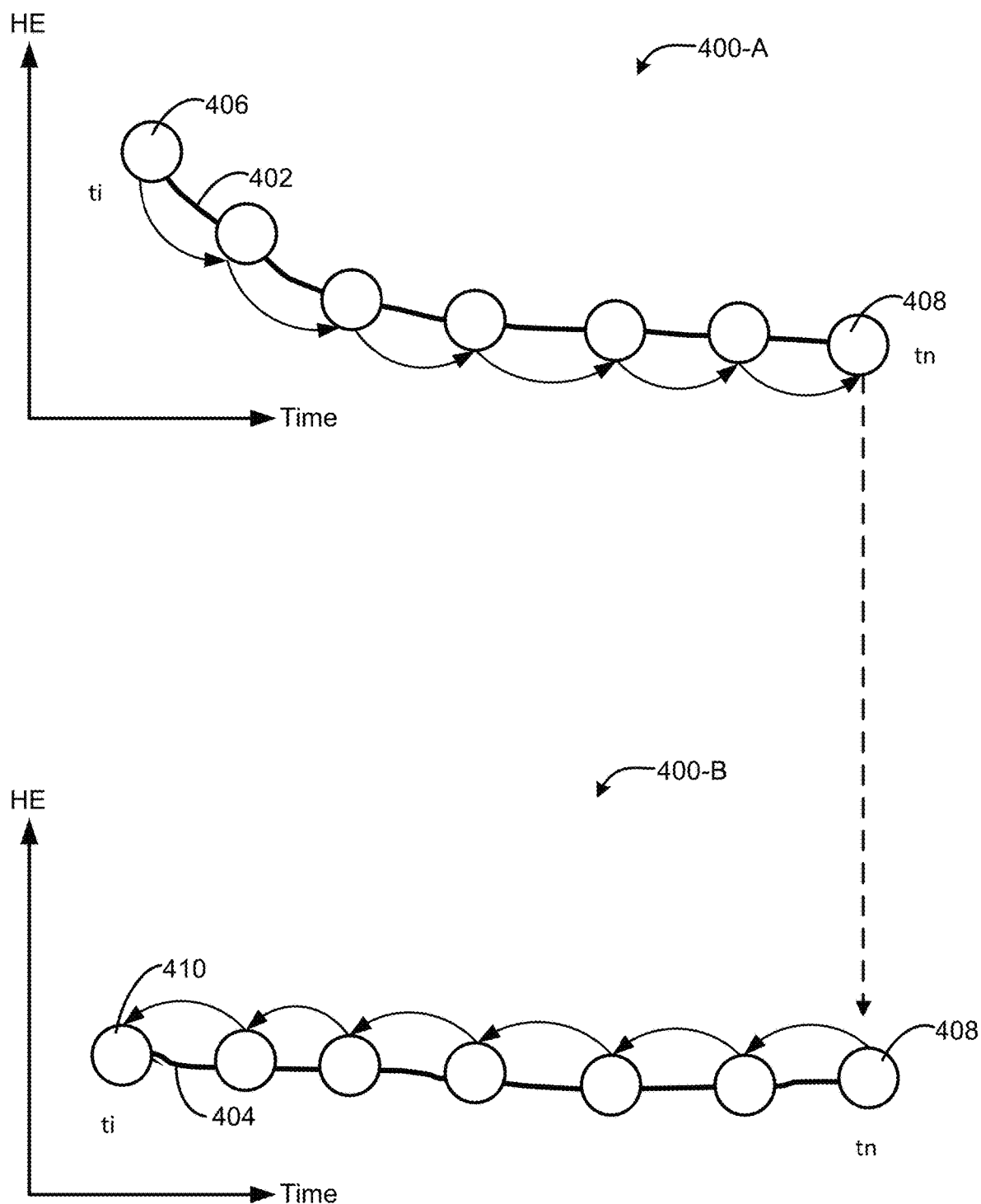
FIG. 4 includes graphical representations of how backward smoothing may be performed, according to an embodiment.

FIG. 4 is graphical representation of how simplified PPE backward smoothing procedure may be implemented in quasi-real-time, according to some embodiments. Similar to graphs 300-A and 300-B in FIG. 3, graphs 400-A and 400-B represent forward smoothing and backward smoothing, respectively. The lines 402 and 404 represent horizontal error for forward smoothing and backward smoothing, respectively. Circles represent an EKF state at various epochs. As indicated by the arrows in graph 400-A, each EKF state relies on the previous EKF state (in time) during forward smoothing, starting with the EKF state 406 at some time ti, and ending at the EKF state 408 at convergence time tn. (It can be noted that, although not illustrated in FIG. 4, the EKF may continue running after convergence to enable the PPE to continue generating estimated locations.) As indicated by the arrows in graph 400-B, backward smoothing involves processing in which each EKF state relies on the subsequent EKF state (in time), where processing begins at EKF state 408 of convergence time tn (which corresponds to EKF state 408 in graph 400-A) and works backward to EKF state 410 at time ti.

As previously noted, and EKF state at convergence time, tn, may be represented as ($P_{tn}$, $\sigma P_{tn}$), where $P_{tn}$ and $\sigma P_{tn}$ respectively represent the positioning solution and positioning uncertainty (reflective of positioning accuracy) at time tn. During convergence, a given time may be expressed as ti and an starting time (e.g., first epoch) may be expressed as t1 Thus, during convergence, the positioning solution over time may be expressed as: $P_{t1}$, . . . $P_{ti}$, . . . $P_{tn}$; and the positioning uncertainty over time may be expressed as: $\sigma P_{t1}$, . . . $\sigma P_{ti}$, . . . $\sigma P_{tn}$, where (normally) $\sigma P_{tn} < \sigma P_{t1}$.

To simplify the process of backward smoothing shown in graph 400-B, embodiments may utilize a delta carrier phase (DCP) measurement (e.g., rather than using a separate EKF to process raw measurements) after convergence to determine a change in position. To help ensure no ambiguity is involved, the DCP may be used when no irreparable cycle slip is detected. (That said, a DCP may still be used in cases where, if cycle slip occurs on one or more signals/SVs, there are sufficient other signals/SVs to support continuous tracking.) In such embodiments, for a given epoch at time ti, the change in position, $\Delta P_{ti}$ (e.g., a vector representing XYZ coordinates), may be buffered, where $\Delta P_{ti}$ is defined by the relationship between the absolute position and the delta position: $\Delta P_{ti} = P_{ti} - P_{ti-1}$. (It can be noted that, $P_{ti}$ here may be based on a converged solution due to backwards smoothing. And this $P_{ti}$ may be more accurate than a $P_{ti}$ based on a float (pre-convergence) solution.) The actual buffered value for each epoch may comprise a vector (e.g., a 6×1 vector) comprising change in X, Y, and Z coordinates, as well as corresponding uncertainty ($\sigma$) values for X, Y, and Z. By using the change in position from a DCP measurement, embodiments herein can avoid the need for buffering all raw measurement data (e.g., from all satellites) as done in traditional approaches, significantly reducing the size of the buffer used for backward smoothing and avoiding the need for a separate EKF.

Backward smoothing can then be performed in quasi-real time by using an accurate absolute position $P_{tn}$ based on DCP estimation and accumulated delta positions. Accumulated delta positions from ti to tn can be represented as:

$$\sum_{k=i+1}^{n} \Delta P_{ts}. \quad \text{(Eqn. 1)}$$

The backward smoothed absolute position at ti, referred to as $\check{P}_{ti}$, can be calculated using the following equation:

$$\check{P}_{ti} = P_{tn} - \sum_{k=i+1}^{n} \Delta P_{ts}. \quad \text{(Eqn. 2)}$$

Figure 5:
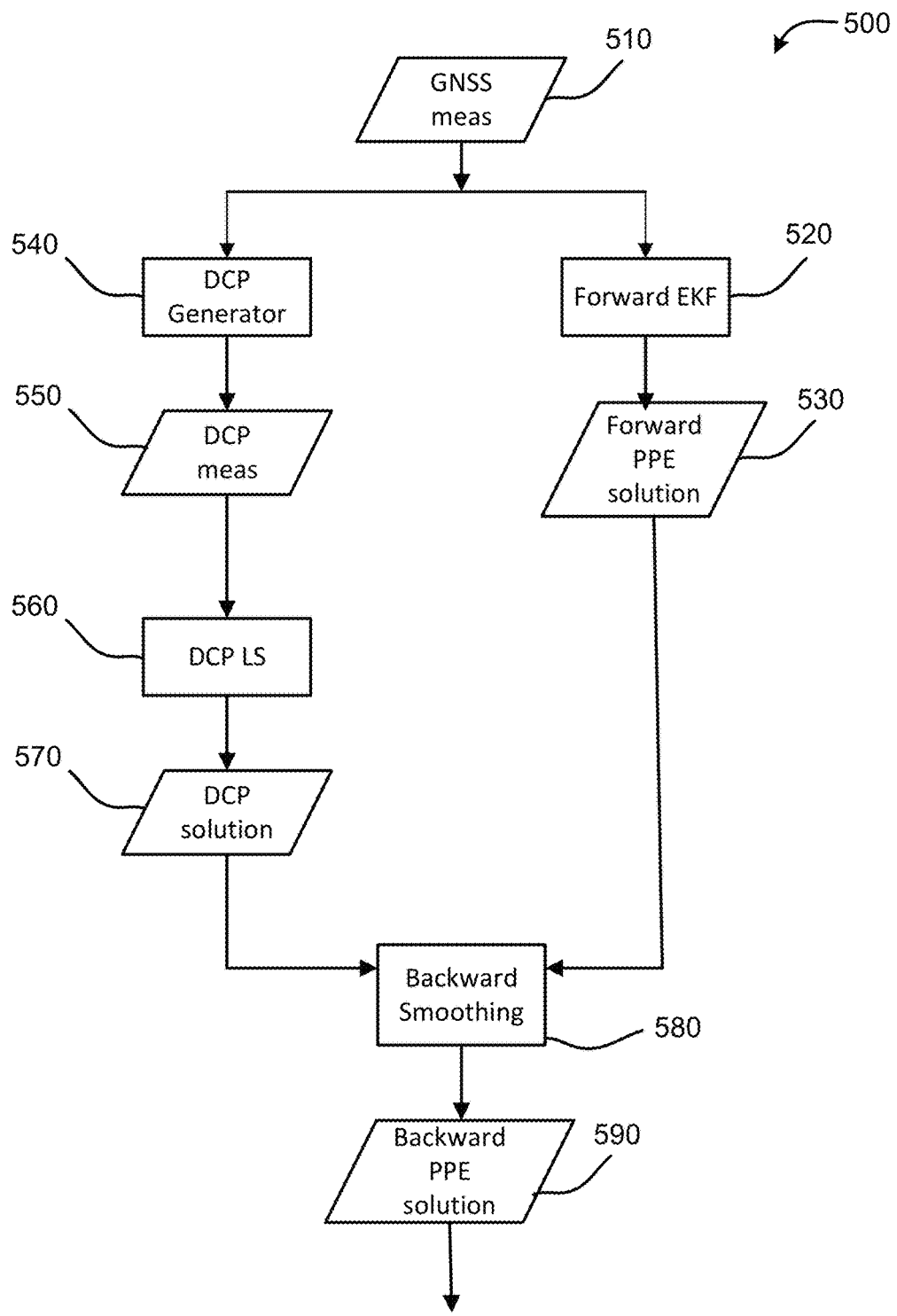
FIG. 5 illustrates an example flow diagram of a process of simplified backward smoothing, according to an embodiment.

FIG. 5 is a flow diagram 500 of a process of backward smoothing that may include checks to help ensure accuracy of the accumulated position $\Sigma_{s=i+1}{}^{n}\Delta P_{ts}$. Specifically, an uncertainty check can be added to help ensure that location estimate having an uncertainty beyond a threshold (e.g., due to a small number of visible satellites) are not used for backward smoothing (e.g., backward smoothing may be stopped at that point). Any or all of the blocks illustrated in FIG. 5 may be performed by a PPE and/or other software and/or hardware components of a GNSS device comprising a GNSS receiver. As indicated elsewhere herein, backward smoothing may be triggered by a determination that an ambiguity term has been resolved (convergence), a threshold accuracy has been met or exceeded, and/or other trigger conditions have been met.

The process may begin at block 510, where GNSS measurements are performed by a GNSS receiver. In some aspects, blocks 520 and 530 illustrate the traditional functionality of a GNSS receiver, in which an EKF performs forward estimation (block 520) and a PPE provides a solution (block 530). In parallel, GNSS measurements are provided to a DCP generator (block 540), from which a DCP measurement is estimated (block 550). Depending on desired functionality, the DCP generator (block 540) may generate the DCP measurement (block 550) using any of a variety of known DCP estimation techniques. A DCP least squared (LS) (block 560) can be used to determine delta position ($\Delta P_s$) and the accumulated delta positions (e.g., as previously described), which may be provided as a DCP solution (block 570). The accumulated delta positions from block 570 and the PPE solution from block 530 can then be used to perform quasi-real-time backward smoothing (block 580) as described above. A backward-smoothed solution (e.g., corrected historical location estimates) can then be output (block 590).

With respect to performing the uncertainty check, a value from the DCP LS 560 may be used to determine whether an uncertainty value exceeds a threshold. For example, if the DCP LS (block 560) determines an uncertainty value for a determined delta-position at time ti (e.g., $\sigma\Delta P_{ti}$) exceeds a threshold (e.g., 3 cm), the backward smoothing (block 580) may stop at time ti, to ensure the accuracy of backward-smoothed position accuracy. In some embodiments, backward smoothing may be ongoing (e.g., after convergence), and may be performed from a current time backward to an initial time (e.g., at which the EKF started), to a time in which previous backward smoothing is determined to meet and accuracy threshold (e.g., further backward smoothing is determined to be not needed), or to a time at which the uncertainty value was exceeded.

FIG. 6 is an illustration of a table 600 showing values for an example case in which techniques provided herein for simplified (quasi-real-time) PPE backward smoothing are applied to example data. Row 610 provides reference numbers, and row 620 identifies the type of cell values for each column in rows 630. As illustrated in colon 1, rows 630 represent numbers for successive epochs from time to time t3. For each time, column 2 shows a ground truth (GT) 3D (XYZ) location, column 3 shows a PPE output (e.g., corresponding to block 530 of FIG. 5), column 4 shows the performance error (e.g., the value at column 3 minus the value at column 2). As can be seen in column 4, 3D error is reduced over time from over 1 m of error at time t0 to about 20 cm at time t3, which follows the pattern of increasing accuracy during convergence described herein, as illustrated in the example chart 300-A of FIG. 3, for example.

Continuing with the columns in table 600, column 5 shows a DCP-determined delta position, column 6 shows accumulated delta positions (e.g., $\Sigma_{s=ti+1}{}^{n}\Delta P_s$, which may correspond to block 570 of FIG. 5), column 7 shows 3D location after backward smoothing (e.g., corresponding to block 590 of FIG. 5), and column 8 shows the new error after backward smoothing using the accumulated delta positions. As can be seen by comparing values in column 8 with values in column 4, the backward smoothing applied to values at times t0-t2 provide a significant reduction in 3D error.

Figure 7A:
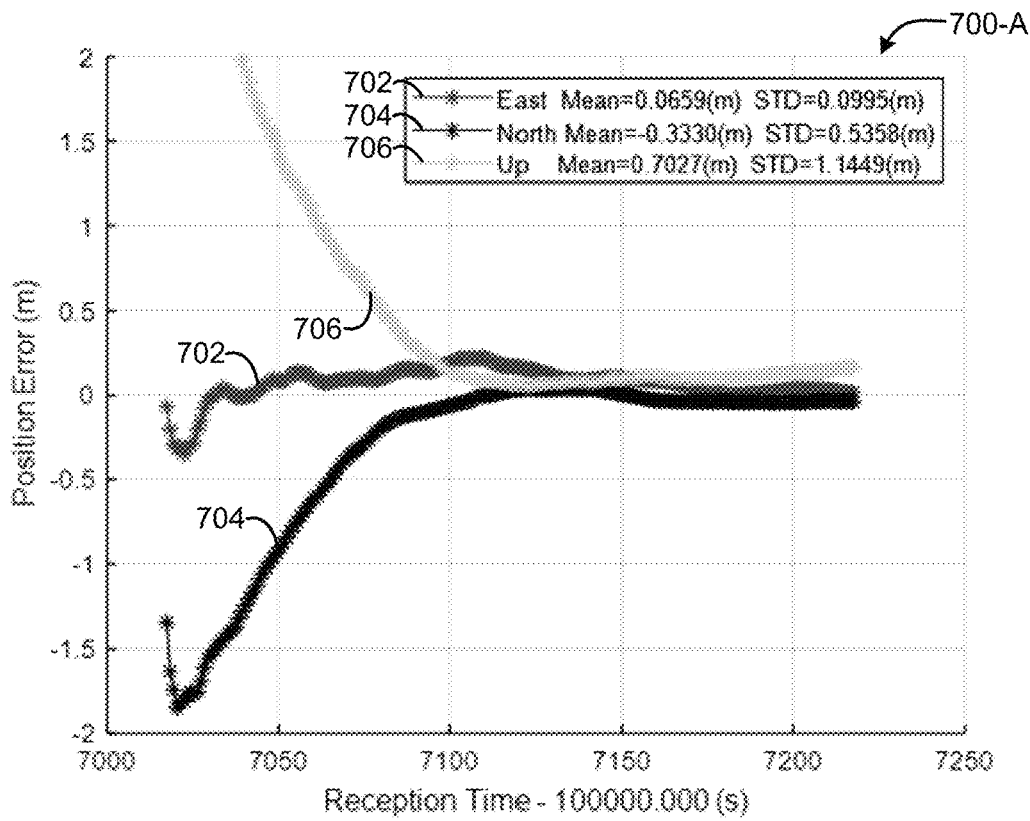
FIGS. 7A-7B are diagrams showing the effectiveness of the backward smoothing techniques provided herein for an example set of GNSS data.
Figure 7A:
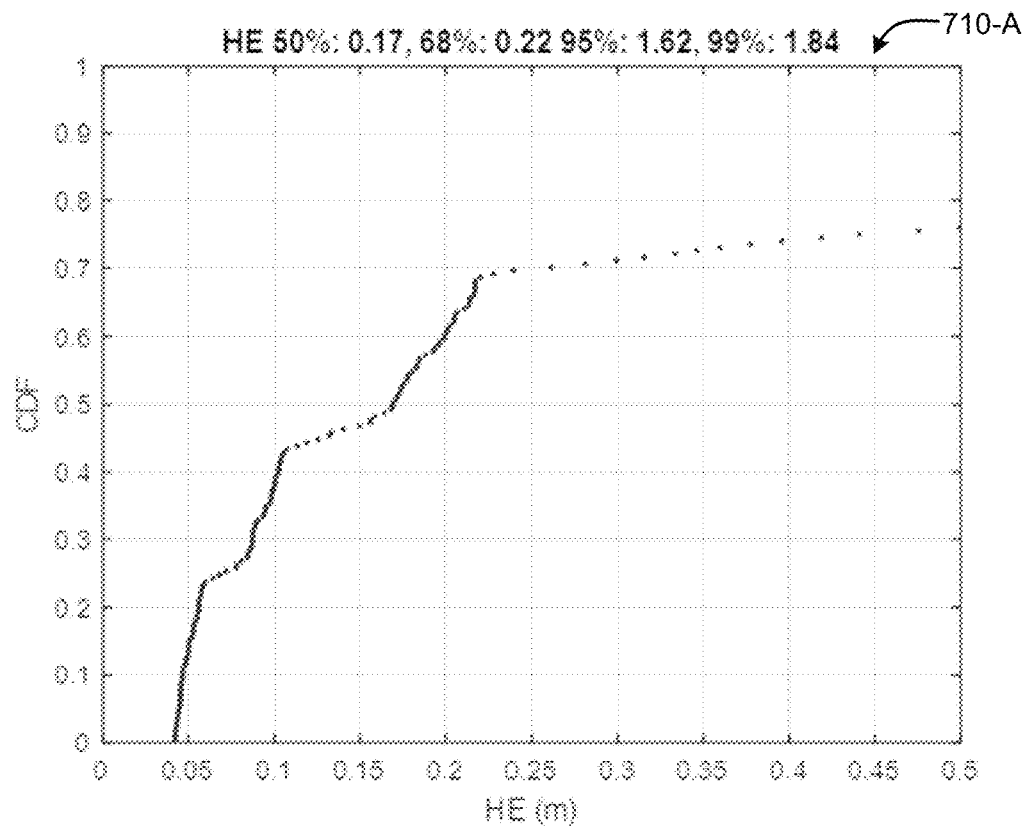
Figure 7B:
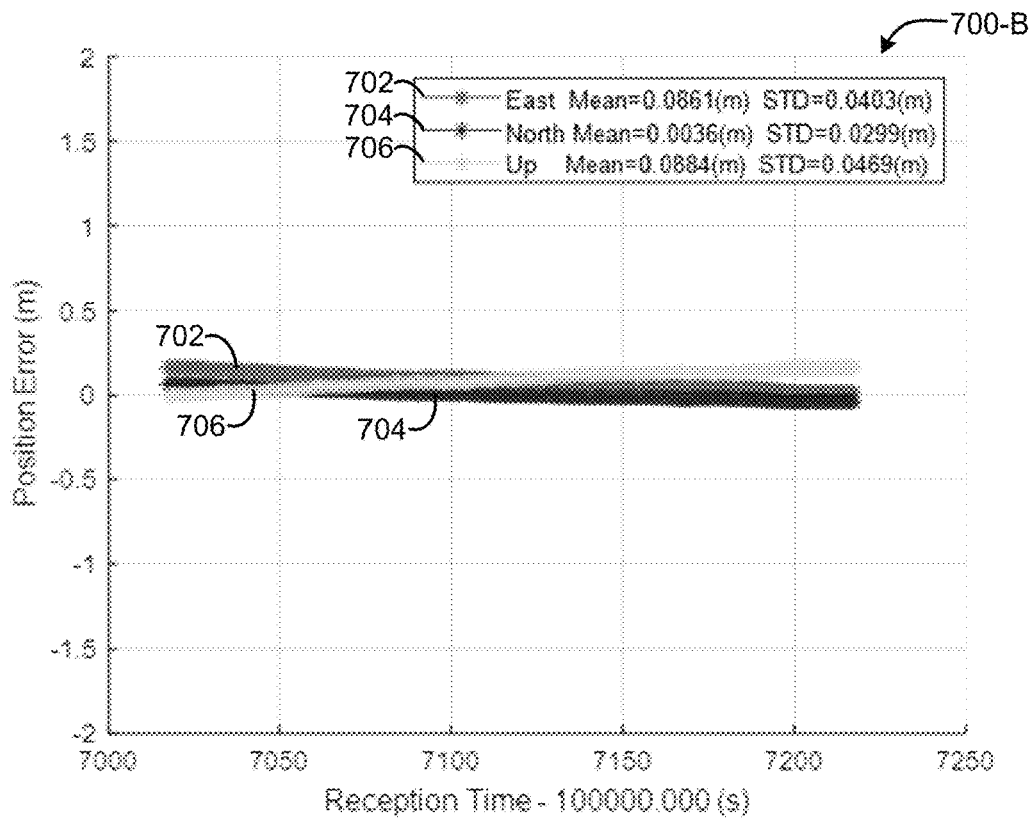
Figure 7B:
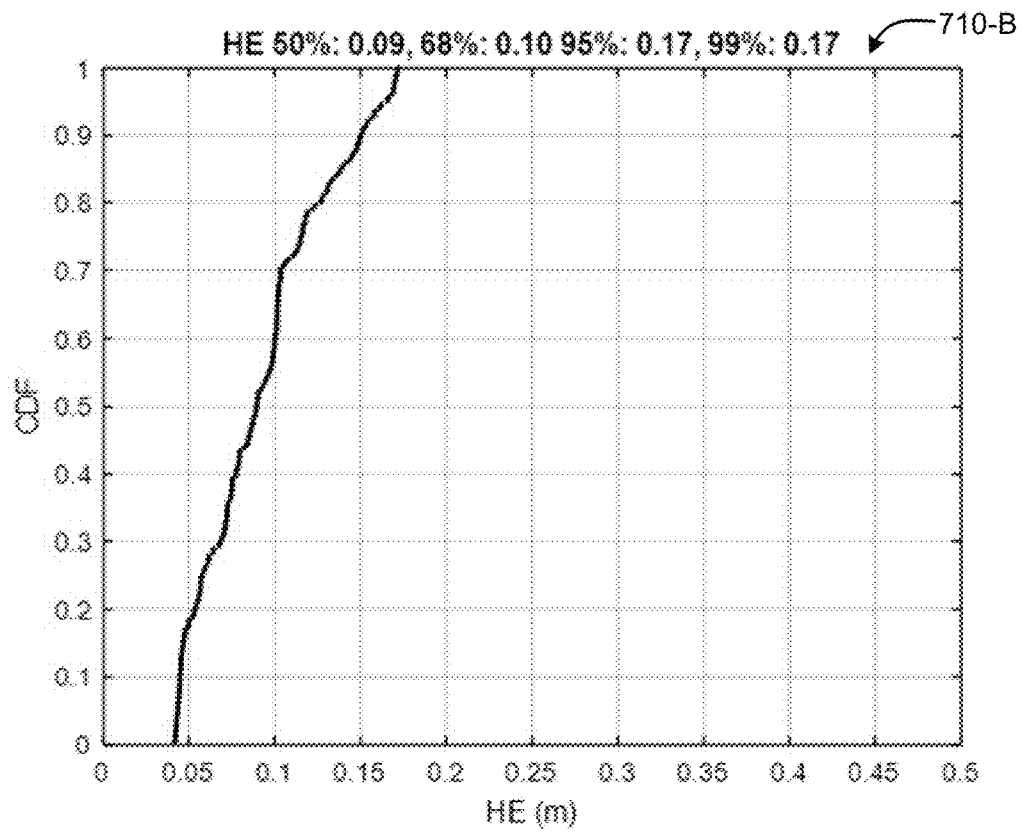

FIGS. 7A-7B are diagrams showing the effectiveness of the backward smoothing techniques provided herein for an example set of GNSS data. FIG. 7A shows a first graph 700-A, prior to backward smoothing, in which position error for East 702, North 704, and Up 706 are plotted over a period of time. (Position error is similar to the HE in graph 300-A of FIG. 3, but with separate cast/north/up components.) As shown, position error for all East 702, North 704, and Up 706 components is initially relatively large (greater than 1 m for North 704 and Up 706), then converges to a much more accurate solution at around the 7100 time marker. Graph 710-A shows a cumulative distribution function (CDF) plot of HE corresponding to graph 700-A, showing that only about 70% of the positions in graph 700-A have an HE of less than 0.25 m.

FIG. 7B, shows a second graph 700-B in which the position error for East 702, North 704, and Up 706 of graph 700-A have been subject to backward smoothing. As shown, position error for all East 702, North 704, and Up 706 components is substantially lower for all components, compared with values but prior to backward smoothing, shown in graph 700-A. Graph 710-B shows a CDF plot of HE corresponding to graph 700-B, showing that 100% of the positions in graph 700-A have an HE of less than approximately 0.17 m.

Figure 8:
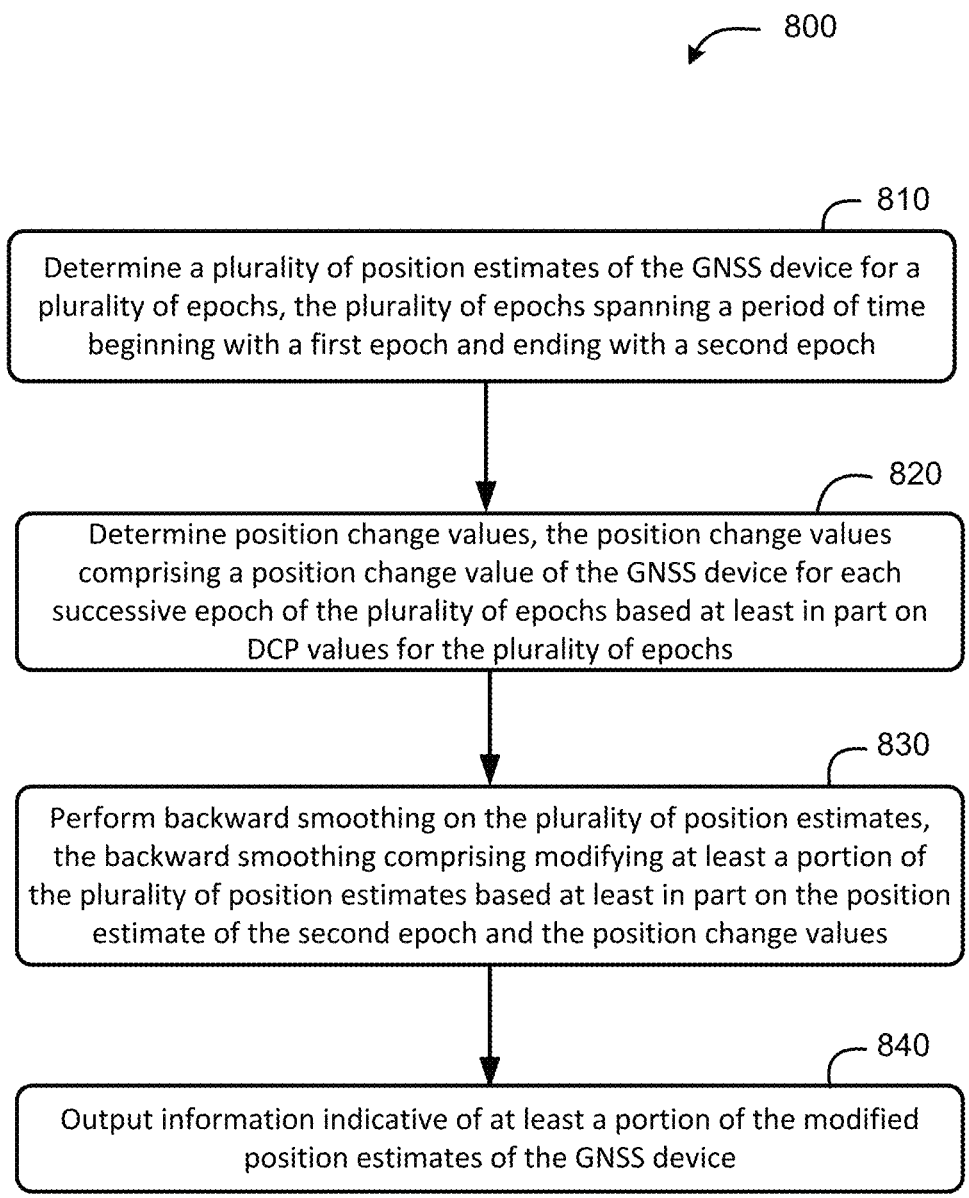
FIG. 8 is a flow diagram of a method of backward smoothing positions of a GNSS device based on DCP values, according to an embodiment.

FIG. 8 is a flow diagram of a method 800 of backward smoothing positions of a GNSS device based on DCP values, according to an embodiment. Some or all of the operations in the blocks illustrated in FIG. 8 may be performed by software and/or hardware components of a GNSS device (e.g., a device comprising and/or communicatively coupled with a GNSS receiver). Further, some or all aspects of the method 800 may be performed within a positioning engine (e.g., PPE) executed by the GNSS device. Example components of a GNSS device are described below with respect FIG. 9.

At block 810, the functionality comprises determining a plurality of position estimates of the GNSS device for a plurality of epochs, the plurality of epochs spanning a period of time beginning with a first epoch and ending with a second epoch. This functionality may correspond with GNSS positioning, as described in the examples corresponding to graphs 300-A and 400-A described herein, which may comprise forward smoothing. At each epoch, the position estimate may be made based on a plurality of GNSS measurements corresponding to a plurality of GNSS signals and SVs. The GNSS device may utilize an EKF to perform the position estimates at each epoch. This functionality may correspond with the functionality of blocks 520 and 530 of FIG. 5, described above.

Figure 9:
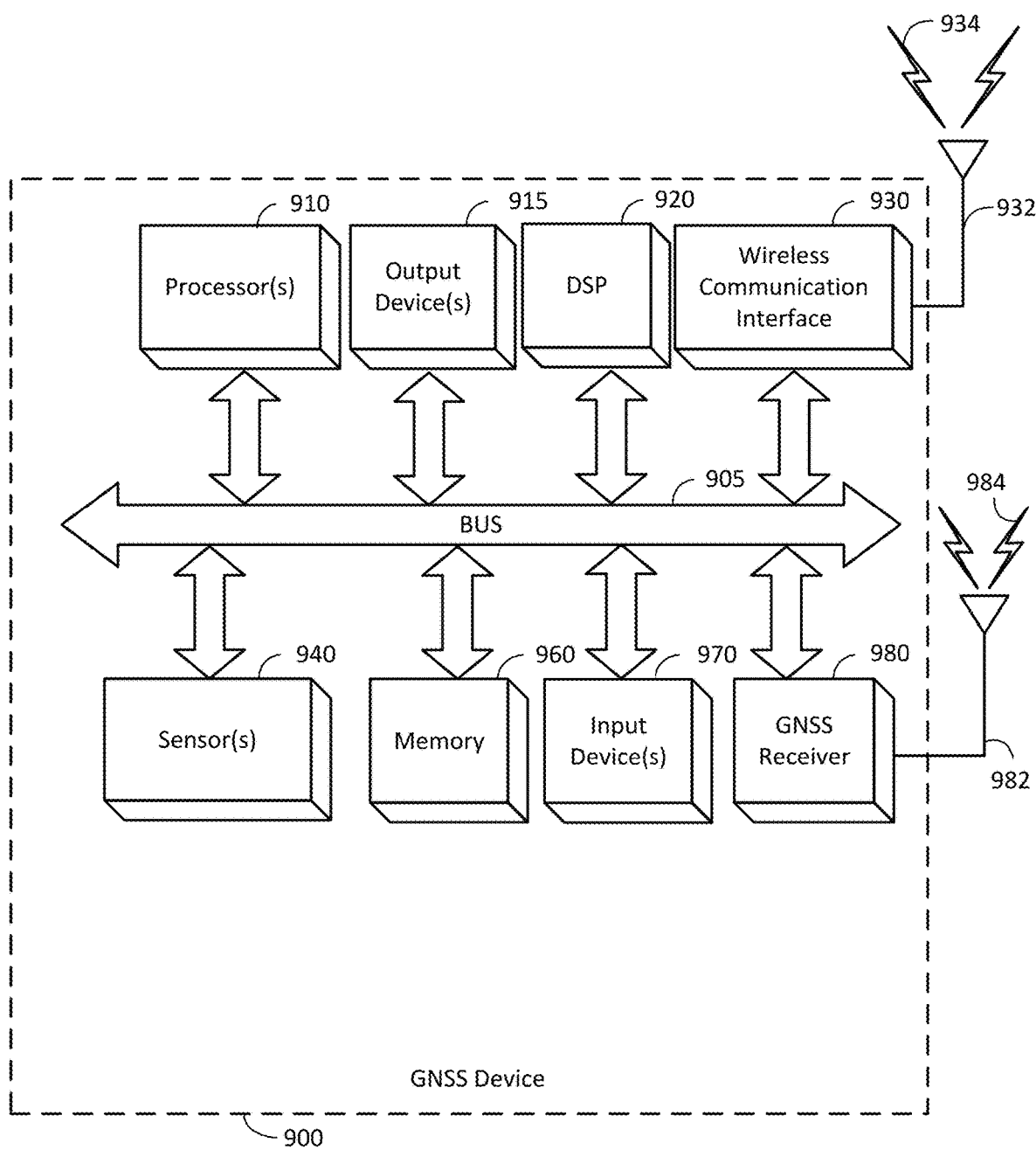
FIG. 9 is a block diagram of various hardware and software components of a GNSS device, according to an embodiment.

Means and/or structure for performing functionality at block 810 may comprise a bus 905, processor(s) 910, digital signal processor (DSP) 920, wireless communication interface 930, sensor(s) 940, memory 960, GNSS receiver 980, and/or other components of a GNSS device 900, as illustrated in FIG. 9.

At block 820, the functionality comprises determining position change values, the position change values comprising a position change value of the GNSS device for each successive epoch of the plurality of epochs based at least in part on DCP values for the plurality of epochs. This functionality may correspond with the blocks 540-570 of FIG. 5 described above. As noted, delta positions may be accumulated in a term (e.g., Eqn. 1) that may be subsequently used for backward smoothing (e.g., Eqn. 2). As noted, according to some embodiments, the change value of the GNSS device for each successive epoch of the plurality of epochs comprises (i) respective coordinate values indicative of the respective position change, and (ii) an uncertainty value for each of the respective coordinate values. As noted herein, each position change value may be represented by a 6×1 vector or another data structure.

Means and/or structure for performing functionality at block 820 may comprise a bus 905, processor(s) 910, DSP 920, wireless communication interface 930, sensor(s) 940, memory 960, GNSS receiver 980, and/or other components of a GNSS device 900, as illustrated in FIG. 9.

At block 830, the functionality comprises performing backward smoothing on the plurality of position estimates, the backward smoothing comprising modifying at least a portion of the plurality of position estimates based at least in part on the position estimate of the second epoch and the position change values. In the example of table 600, for example, the first epoch may correspond with time to and the second epochs may correspond with time t3. Modifying the at least a portion of the plurality of position estimates may correspond with modifying position estimates for epochs t0-t2, where the modified position estimate may correspond with column 7 of table 600 (the backward smoothed XYZ). Of course, embodiments are not limited to the example of table 600.

Means and/or structure for performing functionality at block 830 may comprise a bus 905, processor(s) 910, DSP 920, wireless communication interface 930, sensor(s) 940, memory 960, GNSS receiver 980, and/or other components of a GNSS device 900, as illustrated in FIG. 9.

At block 840, the functionality comprises output information indicative of at least a portion of the modified position estimates of the GNSS device. As indicated previously, backward smoothing may be used in a variety of applications. The type of output may depend on the type of application. Because the method 800 may be performed by components of a GNSS device, outputting the information may comprise providing the information to other components or other devices. According to some embodiments, outputting the information indicative of the at least the portion of the modified position estimates comprises sending the information from to an application processor or an operating system of the GNSS device, providing the information at a user interface of the GNSS device, sending the information from the GNSS device to another device, or any combination thereof.

Means and/or structure for performing functionality at block 840 may comprise a bus 905, processor(s) 910, DSP 920, wireless communication interface 930, sensor(s) 940, memory 960, GNSS receiver 980, and/or other components of a GNSS device 900, as illustrated in FIG. 9.

As described elsewhere herein, embodiments may include implement features. As noted, backward smoothing may be performed in conjunction with convergence, where preconvergence values are smoothed based on a post-convergence solution. Thus, according to some embodiments, the second epoch may occur on or after convergence of an ambiguity term in GNSS measurements performed by the GNSS device, and the first epoch may occur prior to the convergence. Additionally or alternatively, performing the backward smoothing may be responsive to a determination that the second epoch occurs after convergence of an ambiguity term in GNSS measurements performed by the GNSS device, the position estimate of the GNSS device for the second epoch has at least a threshold level of accuracy, or both. According to some embodiments, performing the backward smoothing may be responsive to a determination that irreparable cycle slip has not occurred between successive GNSS measurements performed by the GNSS device in the period of time beginning with the first epoch and ending with the second epoch. Further, as noted herein with respect to FIG. 5, embodiments may perform smoothing for delta position values less than a threshold. Thus, according to some embodiments, performing the backward smoothing may be responsive to a determination that the position change value of the GNSS device for each successive epoch of the plurality of epochs has a respective uncertainty value within a threshold.

FIG. 9 is a block diagram of an embodiment of a GNSS device 900, which can be utilized as described herein above (e.g., in association with FIGS. 1-8). In some embodiments, GNSS device 900 may implement a PPE, can perform the operations illustrated in FIG. 5, and/or perform the method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 9.

The GNSS device 900 is shown comprising hardware elements that can be electrically coupled via a bus 905 (or may otherwise be in communication, as appropriate). The hardware elements may include a processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The GNSS device 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The GNSS device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the GNSS device 900 to communicate with other devices as described in the embodiments above. The wireless communication interface 930 may permit data and signaling to be communicated (e.g., transmitted and received) with base stations of a network, for example, via cNBs, gNBs, ng-eNBs, access points, and/or other access node types, and/or other network components, computer systems, and/or any other electronic devices communicatively coupled with base stations, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The GNSS device 900 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The GNSS device 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the GNSS device 900 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the GNSS device 900, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 910 or DSP 920.

The GNSS device 900 may further include and/or be in communication with a memory 960. The memory 960 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the GNSS device 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the GNSS device 900 (and/or processor(s) 910 or DSP 920 within GNSS device 900). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of backward smoothing positions of a global navigation satellite system (GNSS) device based on delta carrier phase (DCP) values, the method comprising: determining a plurality of position estimates of the GNSS device for a plurality of epochs, the plurality of epochs spanning a period of time beginning with a first epoch and ending with a second epoch; determining position change values, the position change values comprising a position change value of the GNSS device for each successive epoch of the plurality of epochs based at least in part on DCP values for the plurality of epochs; performing backward smoothing on the plurality of position estimates, the backward smoothing comprising modifying at least a portion of the plurality of position estimates based at least in part on the position estimate of the second epoch and the position change values; and outputting information indicative of at least a portion of the modified position estimates of the GNSS device.

Clause 2: The method of clause 1, wherein the second epoch occurs on or after convergence of an ambiguity term in GNSS measurements performed by the GNSS device, and the first epoch occurs prior to the convergence.

Clause 3: The method of any one of clauses 1-2 wherein performing the backward smoothing is responsive to a determination that irreparable cycle slip has not occurred between successive GNSS measurements performed by the GNSS device in the period of time beginning with the first epoch and ending with the second epoch.

Clause 4: The method of any one of clauses 1-3 wherein the position change value of the GNSS device for each successive epoch of the plurality of epochs comprises (i) respective coordinate values indicative of the respective position change, and (ii) an uncertainty value for each of the respective coordinate values.

Clause 5: The method of any one of clauses 1-4 wherein performing the backward smoothing is responsive to a determination that the position change value of the GNSS device for each successive epoch of the plurality of epochs has a respective uncertainty value within a threshold.

Clause 6: The method of any one of clauses 1-5 wherein performing the backward smoothing is responsive to a determination that: the second epoch occurs after convergence of an ambiguity term in GNSS measurements performed by the GNSS device, the position estimate of the GNSS device for the second epoch has at least a threshold level of accuracy, or both.

Clause 7: The method of any one of clauses 1-6 wherein outputting the information indicative of the at least the portion of the modified position estimates comprises: sending the information from to an application processor or an operating system of the GNSS device, providing the information at a user interface of the GNSS device, sending the information from the GNSS device to another device, or any combination thereof.

Clause 8: A global navigation satellite system (GNSS) device for backward smoothing positions of the GNSS device based on delta carrier phase (DCP) values, the GNSS device comprising: a GNSS receiver; a memory; and one or more processors communicatively coupled with the GNSS receiver and the memory, wherein the one or more processors are configured to: determine a plurality of position estimates of the GNSS device for a plurality of epochs, the plurality of epochs spanning a period of time beginning with a first epoch and ending with a second epoch; determine position change values, the position change values comprising a position change value of the GNSS device for each successive epoch of the plurality of epochs based at least in part on DCP values for the plurality of epochs; perform backward smoothing on the plurality of position estimates, the backward smoothing comprising modifying at least a portion of the plurality of position estimates based at least in part on the position estimate of the second epoch and the position change values; and output information indicative of at least a portion of the modified position estimates of the GNSS device.

Clause 9: The GNSS device of clause 8, wherein the second epoch occurs on or after convergence of an ambiguity term in GNSS measurements performed by the GNSS device, and the first epoch occurs prior to the convergence.

Clause 10: The GNSS device of any one of clauses 8-9 wherein the one or more processors are configured to perform the backward smoothing responsive to a determination that irreparable cycle slip has not occurred between successive GNSS measurements performed by the GNSS device, using the GNSS receiver, in the period of time beginning with the first epoch and ending with the second epoch.

Clause 11: The GNSS device of any one of clauses 8-10 wherein, to determine the position change value of the GNSS device for each successive epoch of the plurality of epochs the one or more processors are configured to determine (i) respective coordinate values indicative of the respective position change, and (ii) an uncertainty value for each of the respective coordinate values.

Clause 12: The GNSS device of any one of clauses 8-11 wherein the one or more processors are configured to perform the backward smoothing responsive to a determination that the position change value of the GNSS device for each successive epoch of the plurality of epochs has a respective uncertainty value within a threshold.

Clause 13: The GNSS device of any one of clauses 8-12 wherein the one or more processors are configured to perform the backward smoothing responsive to a determination that: the second epoch occurs after convergence of an ambiguity term in GNSS measurements performed by the GNSS device, the position estimate of the GNSS device for the second epoch has at least a threshold level of accuracy, or both.

Clause 14: The GNSS device of any one of clauses 8-13 wherein, to output the information indicative of the at least the portion of the modified position estimates, the one or more processors are configured to send the information from to an application processor or an operating system of the GNSS device, provide the information at a user interface of the GNSS device, send the information from the GNSS device to another device via a transceiver of the GNSS device, or any combination thereof.

Clause 15: An apparatus for backward smoothing positions of a global navigation satellite system (GNSS) device based on delta carrier phase (DCP) values, the apparatus comprising: means for determining a plurality of position estimates of the GNSS device for a plurality of epochs, the plurality of epochs spanning a period of time beginning with a first epoch and ending with a second epoch; means for determining position change values, the position change values comprising a position change value of the GNSS device for each successive epoch of the plurality of epochs based at least in part on DCP values for the plurality of epochs; means for performing backward smoothing on the plurality of position estimates, the backward smoothing comprising modifying at least a portion of the plurality of position estimates based at least in part on the position estimate of the second epoch and the position change values; and means for outputting information indicative of at least a portion of the modified position estimates of the GNSS device.

Clause 16: The apparatus of clause 15, wherein the second epoch occurs on or after convergence of an ambiguity term in GNSS measurements performed by the GNSS device, and the first epoch occurs prior to the convergence.

Clause 17: The apparatus of any one of clauses 15-16 wherein the means for performing the backward smoothing is configured to perform the backward smoothing responsive to a determination that irreparable cycle slip has not occurred between successive GNSS measurements performed by the GNSS device in the period of time beginning with the first epoch and ending with the second epoch.

Clause 18: The apparatus of any one of clauses 15-17 wherein the means for determining position change value of the GNSS device for each successive epoch of the plurality of epochs comprises means for determining (i) respective coordinate values indicative of the respective position change, and (ii) an uncertainty value for each of the respective coordinate values.

Clause 19: The apparatus of any one of clauses 15-18 wherein the means for performing the backward smoothing is configured to perform the backward smoothing responsive to a determination that the position change value of the GNSS device for each successive epoch of the plurality of epochs has a respective uncertainty value within a threshold.

Clause 20: The apparatus of any one of clauses 15-19 wherein the means for performing the backward smoothing is configured to perform the backward smoothing responsive to a determination that: the second epoch occurs after convergence of an ambiguity term in GNSS measurements performed by the GNSS device, the position estimate of the GNSS device for the second epoch has at least a threshold level of accuracy, or both.

Clause 21: The apparatus of any one of clauses 15-20 wherein the means for outputting the information indicative of the at least the portion of the modified position estimates comprises: means for sending the information from to an application processor or an operating system of the GNSS device, means for providing the information at a user interface of the GNSS device, means for sending the information from the GNSS device to another device, or any combination thereof.

Clause 22: A non-transitory computer-readable medium storing instructions for backward smoothing positions of a global navigation satellite system (GNSS) device based on delta carrier phase (DCP) values, the instructions comprising code for: determining a plurality of position estimates of the GNSS device for a plurality of epochs, the plurality of epochs spanning a period of time beginning with a first epoch and ending with a second epoch; determining position change values, the position change values comprising a position change value of the GNSS device for each successive epoch of the plurality of epochs based at least in part on DCP values for the plurality of epochs; performing backward smoothing on the plurality of position estimates, the backward smoothing comprising modifying at least a portion of the plurality of position estimates based at least in part on the position estimate of the second epoch and the position change values; and outputting information indicative of at least a portion of the modified position estimates of the GNSS device.

Clause 23: The computer-readable medium of clause 22, wherein the second epoch occurs on or after convergence of an ambiguity term in GNSS measurements performed by the GNSS device, and the first epoch occurs prior to the convergence.

Clause 24: The computer-readable medium of any one of clauses 22-23 wherein the code for performing the backward smoothing comprises code for performing the backward smoothing responsive to a determination that irreparable cycle slip has not occurred between successive GNSS measurements performed by the GNSS device in the period of time beginning with the first epoch and ending with the second epoch.

Clause 25: The computer-readable medium of any one of clauses 22-24 wherein the code for determining the position change value of the GNSS device for each successive epoch of the plurality of epochs comprises code for determining (i) respective coordinate values indicative of the respective position change, and (ii) an uncertainty value for each of the respective coordinate values.

Clause 26: The computer-readable medium of any one of clauses 22-25 wherein the code for performing the backward smoothing comprises code for performing the backward smoothing responsive to a determination that the position change value of the GNSS device for each successive epoch of the plurality of epochs has a respective uncertainty value within a threshold.

Clause 27: The computer-readable medium of any one of clauses 22-26 wherein the code for performing the backward smoothing comprises code for performing the backward smoothing responsive to a determination that: the second epoch occurs after convergence of an ambiguity term in GNSS measurements performed by the GNSS device, the position estimate of the GNSS device for the second epoch has at least a threshold level of accuracy, or both.

Clause 28: The computer-readable medium of any one of clauses 22-27 wherein the code for outputting the information indicative of the at least the portion of the modified position estimates comprises code for: sending the information from to an application processor or an operating system of the GNSS device, providing the information at a user interface of the GNSS device, sending the information from the GNSS device to another device, or any combination thereof.

What is claimed is:

1. A method of backward smoothing positions of a global navigation satellite system (GNSS) device based on delta carrier phase (DCP) values, the method comprising:
   determining a plurality of position estimates of the GNSS device for a plurality of epochs, the plurality of epochs spanning a period of time beginning with a first epoch and ending with a second epoch;
   determining position change values, the position change values comprising a position change value of the GNSS device for each successive epoch of the plurality of epochs based at least in part on DCP values for the plurality of epochs;
   performing backward smoothing on the plurality of position estimates, the backward smoothing comprising modifying at least a portion of the plurality of position estimates based at least in part on the position estimate of the second epoch and the position change values; and
   outputting information indicative of at least a portion of the modified position estimates of the GNSS device.

2. The method of claim 1, wherein the second epoch occurs on or after convergence of an ambiguity term in GNSS measurements performed by the GNSS device, and the first epoch occurs prior to the convergence.

3. The method of claim 1, wherein performing the backward smoothing is responsive to a determination that irreparable cycle slip has not occurred between successive GNSS measurements performed by the GNSS device in the period of time beginning with the first epoch and ending with the second epoch.

4. The method of claim 1, wherein the position change value of the GNSS device for each successive epoch of the plurality of epochs comprises (i) respective coordinate values indicative of the respective position change, and (ii) an uncertainty value for each of the respective coordinate values.

5. The method of claim 1, wherein performing the backward smoothing is responsive to a determination that the position change value of the GNSS device for each successive epoch of the plurality of epochs has a respective uncertainty value within a threshold.

6. The method of claim 1, wherein performing the backward smoothing is responsive to a determination that:
   the second epoch occurs after convergence of an ambiguity term in GNSS measurements performed by the GNSS device,
   the position estimate of the GNSS device for the second epoch has at least a threshold level of accuracy, or
   both.

7. The method of claim 1, wherein outputting the information indicative of the at least the portion of the modified position estimates comprises:
   sending the information from to an application processor or an operating system of the GNSS device,
   providing the information at a user interface of the GNSS device,
   sending the information from the GNSS device to another device, or
   any combination thereof.

8. A global navigation satellite system (GNSS) device for backward smoothing positions of the GNSS device based on delta carrier phase (DCP) values, the GNSS device comprising:

a GNSS receiver;

a memory; and one or more processors communicatively coupled with the GNSS receiver and the memory, wherein the one or more processors are configured to:

determine a plurality of position estimates of the GNSS device for a plurality of epochs, the plurality of epochs spanning a period of time beginning with a first epoch and ending with a second epoch;

determine position change values, the position change values comprising a position change value of the GNSS device for each successive epoch of the plurality of epochs based at least in part on DCP values for the plurality of epochs;

perform backward smoothing on the plurality of position estimates, the backward smoothing comprising modifying at least a portion of the plurality of position estimates based at least in part on the position estimate of the second epoch and the position change values; and output information indicative of at least a portion of the modified position estimates of the GNSS device.

9. The GNSS device of claim 8, wherein the second epoch occurs on or after convergence of an ambiguity term in GNSS measurements performed by the GNSS device, and the first epoch occurs prior to the convergence.

10. The GNSS device of claim 8, wherein the one or more processors are configured to perform the backward smoothing responsive to a determination that irreparable cycle slip has not occurred between successive GNSS measurements performed by the GNSS device, using the GNSS receiver, in the period of time beginning with the first epoch and ending with the second epoch.

11. The GNSS device of claim 8, wherein, to determine the position change value of the GNSS device for each successive epoch of the plurality of epochs the one or more processors are configured to determine (i) respective coordinate values indicative of the respective position change, and (ii) an uncertainty value for each of the respective coordinate values.

12. The GNSS device of claim 8, wherein the one or more processors are configured to perform the backward smoothing responsive to a determination that the position change value of the GNSS device for each successive epoch of the plurality of epochs has a respective uncertainty value within a threshold.

13. The GNSS device of claim 8, wherein the one or more processors are configured to perform the backward smoothing responsive to a determination that:

the second epoch occurs after convergence of an ambiguity term in GNSS measurements performed by the GNSS device, the position estimate of the GNSS device for the second epoch has at least a threshold level of accuracy, or both.

14. The GNSS device of claim 8, wherein, to output the information indicative of the at least the portion of the modified position estimates, the one or more processors are configured to:

send the information from to an application processor or an operating system of the GNSS device, provide the information at a user interface of the GNSS device, send the information from the GNSS device to another device via a transceiver of the GNSS device, or any combination thereof.

15. An apparatus for backward smoothing positions of a global navigation satellite system (GNSS) device based on delta carrier phase (DCP) values, the apparatus comprising:

means for determining a plurality of position estimates of the GNSS device for a plurality of epochs, the plurality of epochs spanning a period of time beginning with a first epoch and ending with a second epoch;

means for determining position change values, the position change values comprising a position change value of the GNSS device for each successive epoch of the plurality of epochs based at least in part on DCP values for the plurality of epochs;

means for performing backward smoothing on the plurality of position estimates, the backward smoothing comprising modifying at least a portion of the plurality of position estimates based at least in part on the position estimate of the second epoch and the position change values; and means for outputting information indicative of at least a portion of the modified position estimates of the GNSS device.

16. The apparatus of claim 15, wherein the second epoch occurs on or after convergence of an ambiguity term in GNSS measurements performed by the GNSS device, and the first epoch occurs prior to the convergence.

17. The apparatus of claim 15, wherein the means for performing the backward smoothing is configured to perform the backward smoothing responsive to a determination that irreparable cycle slip has not occurred between successive GNSS measurements performed by the GNSS device in the period of time beginning with the first epoch and ending with the second epoch.

18. The apparatus of claim 15, wherein the means for determining position change value of the GNSS device for each successive epoch of the plurality of epochs comprises means for determining (i) respective coordinate values indicative of the respective position change, and (ii) an uncertainty value for each of the respective coordinate values.

19. The apparatus of claim 15, wherein the means for performing the backward smoothing is configured to perform the backward smoothing responsive to a determination that the position change value of the GNSS device for each successive epoch of the plurality of epochs has a respective uncertainty value within a threshold.

20. The apparatus of claim 15, wherein the means for performing the backward smoothing is configured to perform the backward smoothing responsive to a determination that:

the second epoch occurs after convergence of an ambiguity term in GNSS measurements performed by the GNSS device, the position estimate of the GNSS device for the second epoch has at least a threshold level of accuracy, or both.

21. The apparatus of claim 15, wherein the means for outputting the information indicative of the at least the portion of the modified position estimates comprises:

means for sending the information from to an application processor or an operating system of the GNSS device, means for providing the information at a user interface of the GNSS device, means for sending the information from the GNSS device to another device, or any combination thereof.

22. A non-transitory computer-readable medium storing instructions for backward smoothing positions of a global navigation satellite system (GNSS) device based on delta carrier phase (DCP) values, the instructions comprising code for:
  determining a plurality of position estimates of the GNSS device for a plurality of epochs, the plurality of epochs spanning a period of time beginning with a first epoch and ending with a second epoch;
  determining position change values, the position change values comprising a position change value of the GNSS device for each successive epoch of the plurality of epochs based at least in part on DCP values for the plurality of epochs;
  performing backward smoothing on the plurality of position estimates, the backward smoothing comprising modifying at least a portion of the plurality of position estimates based at least in part on the position estimate of the second epoch and the position change values; and
  outputting information indicative of at least a portion of the modified position estimates of the GNSS device.

23. The computer-readable medium of claim 22, wherein the second epoch occurs on or after convergence of an ambiguity term in GNSS measurements performed by the GNSS device, and the first epoch occurs prior to the convergence.

24. The computer-readable medium of claim 22, wherein the code for performing the backward smoothing comprises code for performing the backward smoothing responsive to a determination that irreparable cycle slip has not occurred between successive GNSS measurements performed by the GNSS device in the period of time beginning with the first epoch and ending with the second epoch.

25. The computer-readable medium of claim 22, wherein the code for determining the position change value of the GNSS device for each successive epoch of the plurality of epochs comprises code for determining (i) respective coordinate values indicative of the respective position change, and (ii) an uncertainty value for each of the respective coordinate values.

26. The computer-readable medium of claim 22, wherein the code for performing the backward smoothing comprises code for performing the backward smoothing responsive to a determination that the position change value of the GNSS device for each successive epoch of the plurality of epochs has a respective uncertainty value within a threshold.

27. The computer-readable medium of claim 22, wherein the code for performing the backward smoothing comprises code for performing the backward smoothing responsive to a determination that:
  the second epoch occurs after convergence of an ambiguity term in GNSS measurements performed by the GNSS device,
  the position estimate of the GNSS device for the second epoch has at least a threshold level of accuracy, or
  both.

28. The computer-readable medium of claim 22, wherein the code for outputting the information indicative of the at least the portion of the modified position estimates comprises code for:
  sending the information from to an application processor or an operating system of the GNSS device,
  providing the information at a user interface of the GNSS device,
  sending the information from the GNSS device to another device, or
  any combination thereof.

* * * * *